United States Patent
Itoh

(10) Patent No.: US 7,024,486 B2
(45) Date of Patent: Apr. 4, 2006

(54) SYSTEM FOR DIRECTLY TRANSMITTING AN IMAGE DATA SIGNAL FROM A SCANNER DEVICE TO A COMPUTER TERMINAL VIA A NETWORK WITHOUT USING A SERVER

(75) Inventor: Shin-Ichi Itoh, Tokyo (JP)

(73) Assignee: NEC Corporation, Tokyo (JP)

( * ) Notice: Subject to any disclaimer, the term of this patent is extended or adjusted under 35 U.S.C. 154(b) by 996 days.

(21) Appl. No.: 09/773,249

(22) Filed: Feb. 1, 2001

(65) Prior Publication Data

US 2001/0021037 A1   Sep. 13, 2001

(30) Foreign Application Priority Data

Feb. 1, 2000   (JP) ............................... 2000-028912

(51) Int. Cl.
*G06F 15/16* (2006.01)
*G06F 15/173* (2006.01)

(52) U.S. Cl. ...................... 709/238; 709/224; 709/227; 709/239; 709/245

(58) Field of Classification Search ................ 709/200, 709/201, 224, 228, 227, 238, 239; 379/100.01–100.17; 358/1.15, 1.18, 440
See application file for complete search history.

(56) References Cited

U.S. PATENT DOCUMENTS

| | | | | |
|---|---|---|---|---|
| 5,862,202 A * | 1/1999 | Bashoura et al. | ...... | 379/100.14 |
| 6,154,465 A * | 11/2000 | Pickett | ...... | 370/466 |
| 6,157,706 A * | 12/2000 | Rachelson | ...... | 379/100.08 |
| 6,292,271 B1 * | 9/2001 | Phan | ...... | 358/440 |
| 6,545,768 B1 * | 4/2003 | Matsubara et al. | ...... | 358/1.15 |
| 6,674,537 B1 * | 1/2004 | Kadowaki | ...... | 358/1.15 |
| 6,710,893 B1 * | 3/2004 | Hou et al. | ...... | 358/1.15 |
| 6,714,315 B1 * | 3/2004 | Yoshida | ...... | 358/1.18 |
| 2001/0012286 A1 * | 8/2001 | Huna et al. | ...... | 370/352 |

FOREIGN PATENT DOCUMENTS

| | | |
|---|---|---|
| JP | 08-102837 | 4/1996 |
| JP | 08-237285 | 9/1996 |
| JP | 9-37013 | 2/1997 |
| JP | 10-032600 | 2/1998 |
| JP | 10-042068 | 2/1998 |
| JP | 10-126600 | 5/1998 |
| JP | 10-150464 | 6/1998 |
| JP | 10-257225 | 9/1998 |
| JP | 10-308840 | 11/1998 |
| JP | 10-320323 | 12/1998 |

(Continued)

OTHER PUBLICATIONS

Stevens, W. Richard; TCP/IP Illustrated; 1994; Addison Wesley; vol. 1: The Protocols; pp. 223-228, 441-459.*

*Primary Examiner*—Rupal Charia
*Assistant Examiner*—Quang N. Nguyen
(74) *Attorney, Agent, or Firm*—Whitham, Curtis, Christofferson & Cook, P.C.

(57) ABSTRACT

A network scanner apparatus is connected to a least one terminal via a network. A control portion controls the network by the use of a TCP/IP protocol. A readout portion reads-out a paper to produce an image data signal. An operation portion inputs an IP address as a transmitting destination of the image data signal. A transmission portion directly transmits the image data signal to the terminal having the inputted IP address.

3 Claims, 11 Drawing Sheets

FOREIGN PATENT DOCUMENTS

| | | |
|---|---|---|
| JP | 11-041441 | 2/1999 |
| JP | 11-098144 | 4/1999 |
| JP | 11-122284 | 4/1999 |
| JP | 11-127298 | 5/1999 |
| JP | 11-134088 | 5/1999 |
| JP | 11-191818 | 7/1999 |
| JP | 11-215339 | 8/1999 |
| JP | 11-275138 | 10/1999 |
| JP | 11-298707 | 10/1999 |
| JP | 11-331447 | 11/1999 |
| JP | 11-331474 | 11/1999 |
| JP | 11-341247 | 12/1999 |
| JP | 11-355494 | 12/1999 |
| JP | 2001-111628 | 4/2001 |
| JP | 2001-111764 | 4/2001 |

\* cited by examiner

SYSTEM FOR DIRECTLY TRANSMITTING AN IMAGE DATA SIGNAL FROM A SCANNER DEVICE TO A COMPUTER TERMINAL VIA A NETWORK WITHOUT USING A SERVER

BACKGROUND OF THE INVENTION

This invention relates to a network scanner apparatus connected for user in a network and a recording medium for recording a program used for the apparatus.

In the conventional scanner apparatus, an image data signal read by a scanner apparatus is once transmitted to a personal computer (hereinafter may be referred to as a PC) that is locally connected via an interface device such as SCSI.

Subsequently, the image data signal is transmitted from one PC to another PC and then is transmitted therefrom via a network by the use of a file transmission application.

Recently, a data signal transmission/reception is carried out widely via a network, such as, a LAN (Local Area Network) and an Internet.

Under this circumstance, a variety of suggestions have been made about network scanner apparatus for transmitting the image data signal via the network in the image scanner apparatus, for example, as disclosed in Japanese Unexamined Patent Publication (JP-A) No. Hei. 10-150464.

Such network scanner apparatus transmits a readout image data signal into a mail server, and the PC receives the image data signal from the mail server. The data transmission has been thus realized in the conventional example.

The mail server is arranged between the scanner apparatus and the PC. Consequently, omission is made about a process in which the image data signal is once transmitted to the PC which is locally connected, and then is sent to another PC to be transmitted therefrom. Herein, it is to be noted that the above-mentioned conventional process was a cause of a problem.

However, in the conventional network scanner apparatus, it is essential for the mail server to be arranged inside the network and the network scanner apparatus is not applicable for a network environment in which the mail server is not being provided.

Even when the network scanner apparatus has been introduced into the network environment in which the mail server is arranged to operate an electronic mail, the following problems are unavoidable.

(1) The image data signals readout from a normal electronic mail and the scanner are received in non-uniform states. In consequence, the network scanner apparatus is unsuitable for a user who deals with the image data signals in a separation state.

(2) The sail server must be set for the network scanner, and an additional mail account must be made.

(3) When the image data signal having a larger amount of data in comparison with the electronic mail are being transmitted and received, a higher load is applied for the mail server and brings the mail server down.

Even when the mail server is not brought down, this condition is generally unsuitable for a system administrator who manages the mail server.

Herein, disclosure has been made about a technique for directly transmitting the image data signal without using the server apparatus, for example, in Japanese Unexamined Patent Publication No. Hei. 1101- 127298.

SUMMARY OF THE INVENTION

It is therefore an object of this invention to provide a network scanner apparatus which is capable of directly transmitting an image data signal from a scanner device to a PC without using a server apparatus, such as, a mail server.

According to this invention, a network scanner apparatus is connected to at least one terminal via a network.

With such a structure, a control portion controls the network by the use of a transmission control protocol and an Internet protocol.

Further, a readout portion reads-out a paper to produce an image data signal.

Moreover, an operation portion inputs an internet protocol address as a transmitting destination of the image data signal.

In addition, a transmission portion directly transmits the image data signal to the terminal having the inputted address.

In this event, the operation portion comprises a one-touch button memory portion which stores the internet protocol address in advance.

Under this circumstance, the transmission portion may transmit the image data signal to the terminal by using a simple mail transfer protocol.

Alternatively, the transmission portion may transmit the image data signal to the terminal by using a file transfer protocol.

In this case, the terminal comprises any one of a personal computer and a work station.

A plurality of terminals may be connected to an Ethernet.

For example, the terminals comprise a first terminal and a second terminal, and the first terminal is connected to the second terminal via a router.

The image data signal is directly transmitted to the terminal without using a server.

As described above, according to this invention, the readout image data signal is directly transmitted to the terminal such as the PC using the IP address as the transmitting destination in the network scanner apparatus due to the TCP/IP network protocol.

Consequently, the image data signal can be transmitted without using the server device, such as, the mail server on the network.

As a result, the load is not applied so as to cause the server-down, and thereby the system can be readily controlled.

Further, the IP address is inputted by the use of the one touch button. Thereby, the input operation can become simpler.

DESCRIPTION OF PREFERRED EMBODIMENTS

Description will be made about a first embodiment of this invention with drawings.

In a first embodiment, an image data signals readout by a scanner device is directly transmitted to a terminal, such as, a personal computer or a work station connected to the same network without using a sever device such as a mail server.

In particular, an IP (Internet Protocol) address is designated as a transmitting destination transmission utilizing TCP (Transmission Control Protocol)/IP (Internet Protocol) as a network protocol. A plurality of terminals connected to the same network by the IP address can be independently identified. Thereby, the readout image date signal can be directly transmitted from the network scanner device.

Herein, general description will be made about the first embodiment with reference to FIGS. 1 and 2.

Figure 1:
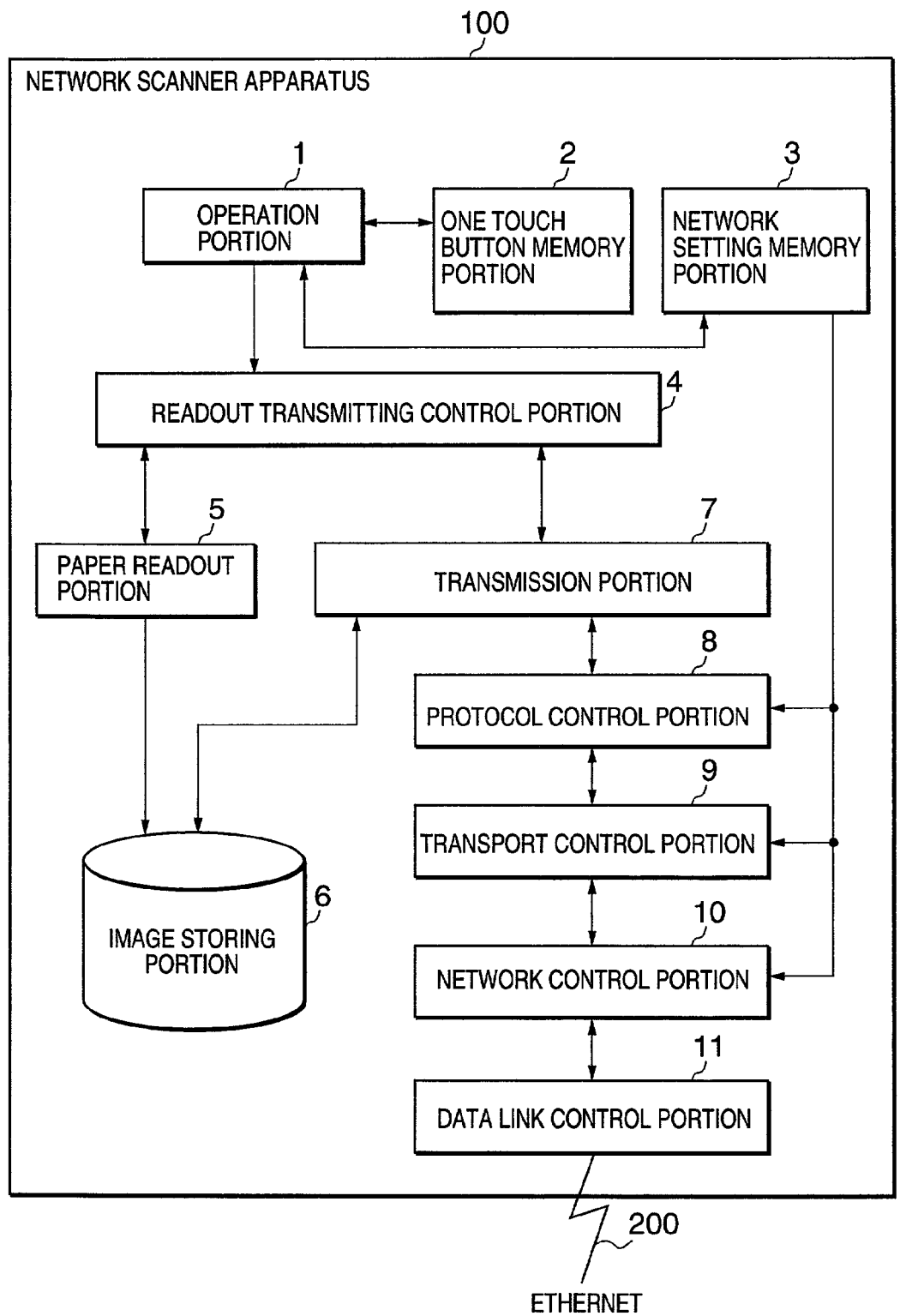
FIG. 1 is a block diagram showing a structure of a network scanner apparatus according to an embodiment of this invention.

Referring to FIG. 1, a user sets a paper for a paper readout portion 5, and inputs the IP address as a transmitting destination from an operation portion 1. Thereby, a readout-transmitting requirement is given to a readout transmitting control portion 4.

Instead the direct input of the IP address as the transmitting destination, the IP address may be registered in a one-touch button memory portion 2 in advance, and thereby, an input operation can be shortened by calling the registered content during a scanning process.

The readout transmitting control portion 4 supplies a scan requirement for the paper readout portion 5 on the basis of the readout-transmitting request. The paper readout portion 5 reads-out the set paper based upon the scan request, and stores the image data signals in an image storing portion 6.

After reading-out the paper, the paper readout portion 5 produces a scar completion notice for a readout transmitting control portion 4.

When the readout transmitting control portion 4 receives the scan completion notice, the readout transmitting control portion 4 supplies a transmission request for a transmission portion 7 using the inputted IP address as a transmitting destination.

The transmission portion 7 captures the image data signal stored in the image storing potion 6 on the basis of the transmission request, and transmits the image data signal for the designated IP address by the use of a protocol control portion 8.

This transmission operation is realized by using a transport control portion 9 by a protocol control portion 8, using a network control portion 10 by the transport control portion 9, using a data link control portion 11 by the network control portion 10, and controlling an Ethernet 200 by the data link control portion 11.

Figure 2:
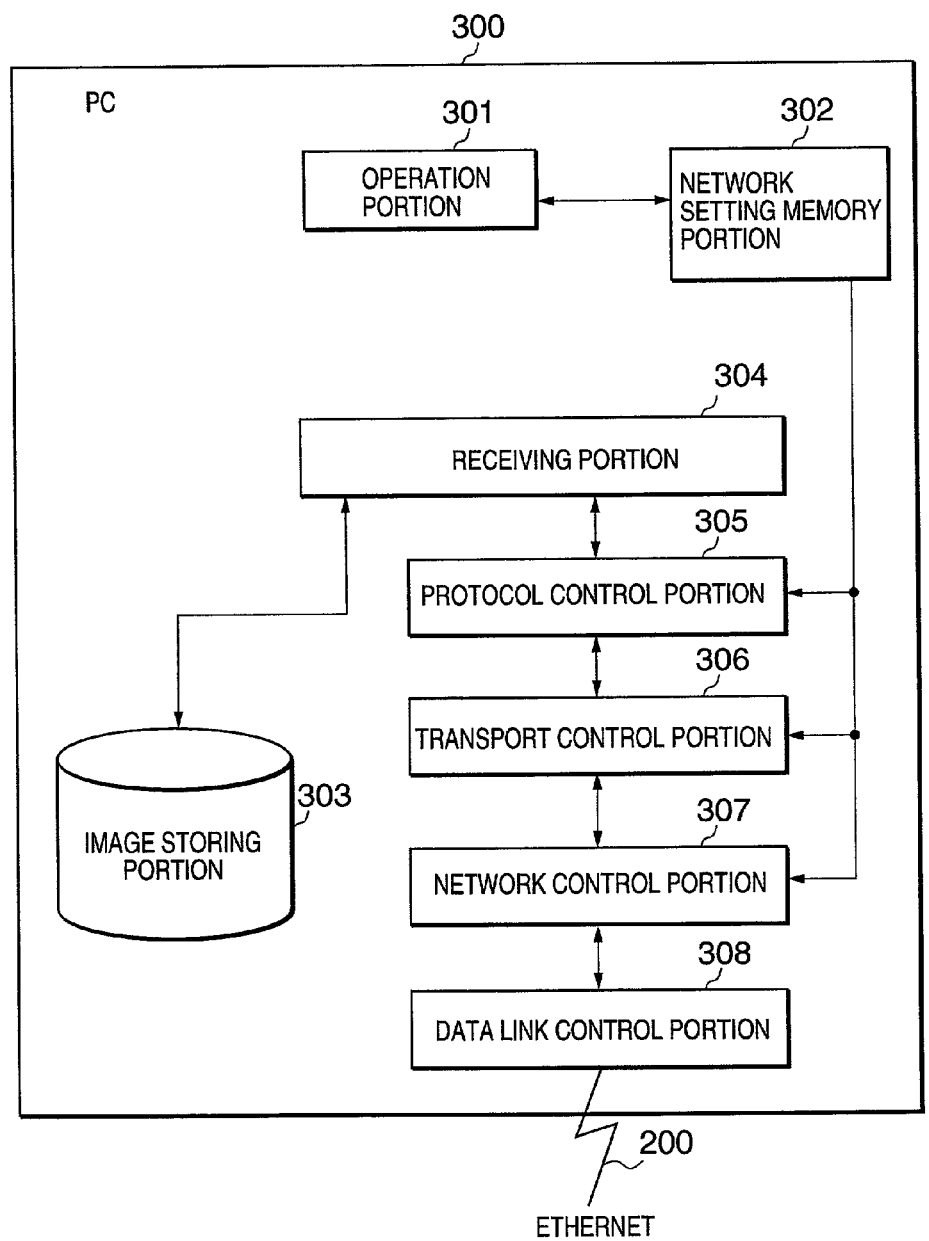
FIG. 2 is a block diagram showing a structure of a terminal according to an embodiment of this invention.

Referring to FIG. 2, a receiving portion 304 receives the image data signal by the use of a protocol control portion 306, and stores the received signal in an image storing portion 303.

The receiving operation is realized using a transport control portion 306 by a protocol control portion 305, using a network control portion 307 by the transport control portion 306, using a data link control portion 308 by the network control portion 307, and controlling an Ethernet 200 by the data link control portion 308.

The transport control portion, the network control portion, the data link control portion execute functions called a transport layer, a network layer, a data link layer in open system interconnection (OSI) reference model, respectively, and carry out TCP, IP, and Ethernet controls so as to realize a TCP/IP protocol.

If the IP addresses of a sender (a transmitting origination) and a transmitting destination are decided in the TCP/IP protocol, a communication between end terminal nodes is constituted.

Such a system is utilized in this embodiment. Thereby, the image data signal can be directly transmitted from the network scanner device 100 to the terminal without using the server device, such as, the mail server.

Referring to FIGS. 3 through 6, description will be made about a first embodiment. More specifically, FIGS. 3 through 6 are structure diagrams of a network system between the network scanner device and the terminals of the transmitting destination.

Herein, it is to be noted that the terminal of the transmitting destination includes a personal computer and a workstation, and will be referred to as a PC in this embodiment.

The network scanner apparatus 100 and the PC 300 are connected to a local area network (LAN) or an Internet via an Ethernet 200.

Figure 3:
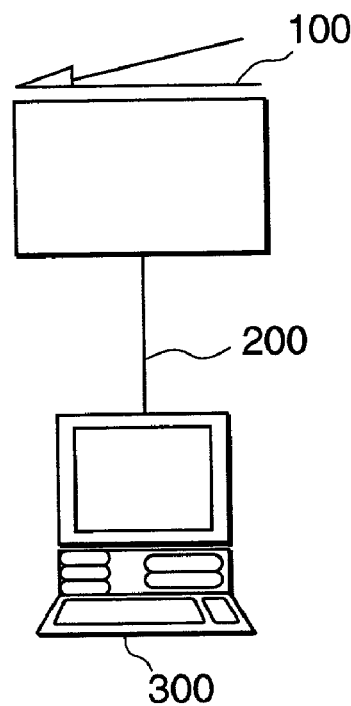
FIG. 3 is a block diagram showing a structure of a network system according to an embodiment of this invention.

In a network system illustrated in FIG. 3, only the network scanner apparatus and the PC 300 are connected to each other via the Ethernet. This network system may be simplest LAN. With such a structure, the network scanner apparatus can communicate with the PC 300.

Figure 4:
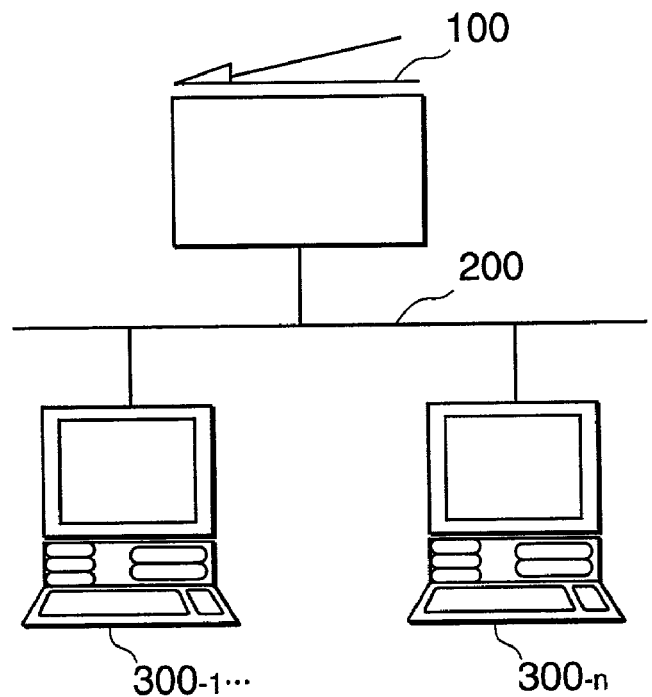
FIG. 4 is a block diagram showing another structure of a network system according to an embodiment of this invention.

In FIG. 4, the network scanner apparatus 100 is connected to a plurality of PCs 300-1~300-n via the Ethernet 200. Thereby, the network scanner apparatus 100 can communicate with the PCs 300-1~300-n, respectively.

Figure 5:
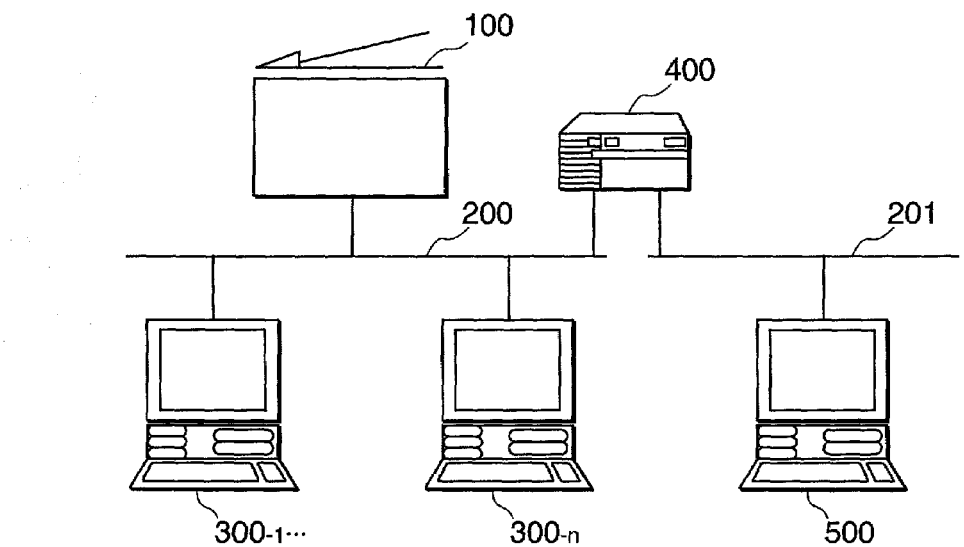
FIG. 5 is a block diagram showing other structure of a network system according to an embodiment of this invention.

In FIG. 5, a network, in which the network scanner apparatus 100 and a plurality of PCs 300-1~300n are connected to each other via the Ethernet 200, is connected to another network, in which the PC 500 is connected to the Ethernet 201, via router 400 so as to communicate between both networks.

Figure 6:
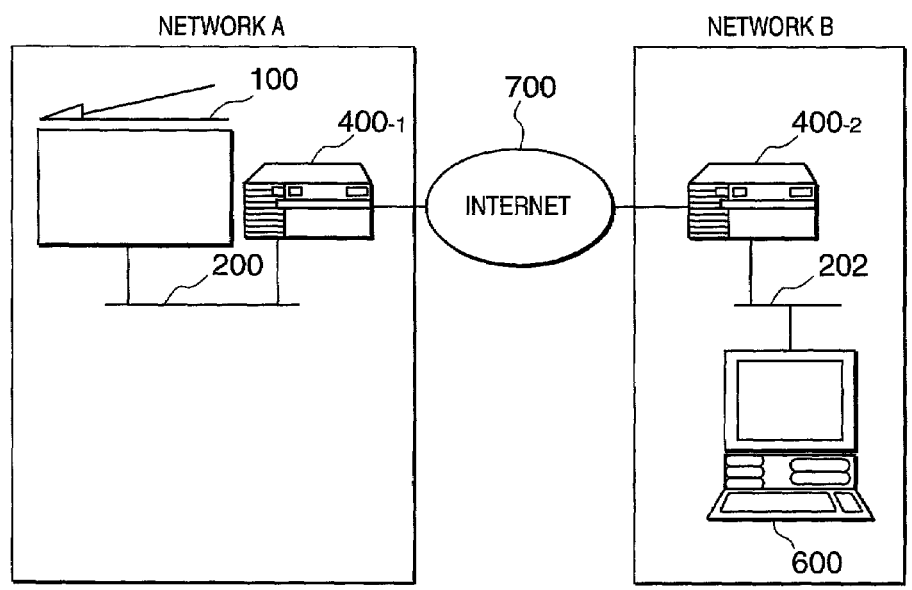
FIG. 6 is a block diagram showing other structure of a network system according to an embodiment of this invention.

In FIG. 6 a network A, in which the network scanner apparatus 100 is connected to the Ethernet 200, is connected to another network B, in which a PC 600 is connected to the Ethernet 202, via an internet 700 through routers 400-1 and 400-2 in order to communicate through the internet 700.

Referring back to FIG. 1, the network scanner apparatus 100 includes an operation portion 1, a one touch button memory portion 2, a network setting memory portion 3, a readout transmitting control portion 4, a paper readout portion 5, an image storing portion 6, a transmission portion 7, a protocol control portion 8, a transport control portion 9, a network control portion 10, and a data link control portion 11.

In the meantime, the PC 300 comprises an operation portion 301, a network setting memory portion 302, an image storing portion 303, a receiving portion 304, a protocol control portion 305, a transport control portion 306, a network control portion 307, and a data link control portion 308.

In FIG. 1, the operation portion 1 has a display (not shown) for displaying a character and a figure, and a key switch (not shown) for input. The user inputs the IP address as the transmitting destination from the operation portion 1 to supply a readout transmission requirement into the readout transmitting control portion 4.

Herein, the IP address indicates a position of a network equipment on the network by TCP/IP protocol, and is represented by an integral value of 32 bits (4 octet). Generally, the IP address is represented by punctuating via periods for every 8 bits, like 11, 22, 33, 44.

Alternatively, the user can register the IP address in the one touch button memory portion 2 in advance without directly inputting the IP address of the transmitting destination. In this case, an input operation can be shortened by calling the registered information (address) from the one touch button memory portion 2 via the operation portion 1 during a scanning operation.

The one touch button memory portion 2 stores a plurality of IP addresses, which are frequently used, in a nonvolatile memory. Under this circumstance, the user can freely register, correct and eliminate the registered information stored in the one touch button memory portion 2.

The network setting memory portion 3 stores a local IP address serving as a network setting information, sub-netmask, and, default root in the nonvolatile memory. In this condition, the user can freely register, correct, and eliminate the registered information stored in the network setting memory portion 3.

Herein, it is to be noted that the local IP address corresponds to an IP address the network scanner apparatus 100. The sub-netmask is a number which is used for judging whether or not the network equipment having a certain IP address is connected to the same Ethernet as the network equipment 100.

Generally, the sun-netmask is punctuated via periods for every 8 bits in the same manner as the IP address, and is represented as "1" until several host bits and otherwise as "0", like 255, 255, 255.0.

In this event, it is judged that the network equipment having the same IP address at a post portion of 24 bits is connected to the same Ethernet as the network scanner apparatus 100.

The default root is an IP address for transmitting a packet in the case where the P address of the transmitting destination does not exist on the same Ethernet by judging from the local address and the sub-netmask, namely in the case that the packet can not be directly transmitted from the network scanner apparatus 100 when the packet is transmitted by IP (Internet Protocol). Generally, an IP address of a router or the like may be set.

The readout transmitting control portion 4 supplies the scan requirement to the paper readout portion 5 on the basis of a readout transmission requirement from the operation portion 1.

Further, the readout transmitting control portion 4 produces the transmission requirement using the IP address designated by the transmission potion 7 as the transmitting destination.

Moreover, the readout transmitting control portion 4 controls an entire scan operation. More specifically, the readout transmitting control portion 4 read-outs the paper to store the image data signal, and transmits the stored image data signal using the designated IP address as the transmitting destination.

The paper readout portion 5 produces the image data signal which is converts into a digital data signal by reading out the paper.

Namely, the paper readout portion 5 reads-out the set paper based upon the scan requirement from the readout transmitting control portion 4, stores the readout image data signal in the image storing portion 6, and supplies the scan completion notice to the readout transmitting control portion 4 after the storing is completed.

The image storing portion 6 stores the image data signal inputted from the paper readout portion 5, and produces the stored image data signal by controlling the transmission portion 7.

The transmission portion 7 captures the image data signal from the image storing portion 6 on the basis of the transmission requirement from the readout transmitting control portion 4 to convert the data signal, and transmits to the IP address of the transmitting destination designated by the transmission requirement using the protocol control portion 8.

This data conversion is carried out so as to comply with the protocol used by the protocol control portion 8. In this embodiment, use is made about SMTP (Simple Mail Transfer Protocol) which is used during transmitting and receiving the electronic mail. To this end, the data signal is converted into TIFF (Tagged Image File Format) used for the electronic Hall.

The protocol control portion 8 provided a function called an application layer of the open system interconnection (OSI) reference model defined in ISO.

In this event, the application layer performs a communication process at every applications, such as an electronic mail and a file transfer. Herein, it is to be noted that the protocol control portion 8 is provided with the function of the SMTP protocol in this embodiment.

With such a structure, the image data signal readout by the instruction of the transmission portion 7 is transmitted via the SMTP protocol by using the transport control portion 9.

The transport control portion 9 provides a function called a transport layer of the OSI reference model. The transport layer conducts a transparent data transfer having high reliability, such as, a control of re-transmission for restoring an error and a sequence control of a packet in accordance with a quality of a communication network.

To this end, the transport control portion 9 has a function of a TCP (Transmission Control Protocol) using the network control portion 10.

The network control portion 10 provides a function called a network layer of the OSI reference model. The network layer provides a routing (selection of a communication path) function for performing a data transfer between systems at both ends via the communication network and a data relay function.

To this end, the network control portion 10 has the function of the IP (Internet Protocol) using the data link control portion 11.

The data link control portion 11 has a function corresponding to a data link layer of the OSI reference model. The data link layer provides a function for performing an accurate data transfer between adjacent systems using a bit line transmission function provided by a physical layer.

To this end, the data link control portion 11 transfer the data in the same Ethernet by controlling the Ethernet 200.

Referring to FIG. 2, the operation portion 301 comprises a displaying device (not shown) such as, a display of the PC 300 or an input device, such as, a mouse and a keyboard.

The operation portion 301 displays a network setting information with reference to the registered information from the network setting memory portion 302. Further, the operation portion 301 can register the information in the network setting memory portion 302, and correct and eliminate the information registered therein.

The network setting memory portion 302 stores the local IP address serving as the network setting information, the sub-netmask, and the default root.

The receiving portion 304 performs a receiving operation by the use of the protocol control portion 305, and supplies the received image data signal into the image-storing portion 303.

The image storing portion 303 stores the image data signal received by the receiving portion 304.

The protocol control portion 305 has a function equivalent to the protocol control portion 8 of the network scanner apparatus 100, and receives the SMTP protocol using the transport control portion 306.

The transport control portion 306 has a function equivalent to the transport control portion 9 of the network scanner apparatus 100 to realize the TCP protocol by the use of a network control portion 307.

The network control portion 307 has a function equivalent to the network control portion 10 of the network scanner apparatus 100, and realizes the IP protocol using a data link control portion 308.

The date link control portion 308 has a function equivalent to the data link control portion 11 of the network scanner apparatus 100, and transfers the data signal in the identical Ethernet by controlling the Ethernet 200.

Subsequently, description will be made about the total operation of this embodiment with reference to FIGS. 1 through 6, flowcharts illustrated in FIGS. 7 and 8, a sequence chart illustrated in FIG. 9, structure diagrams illustrated in FIGS. 10 through 12.

Figure 7:
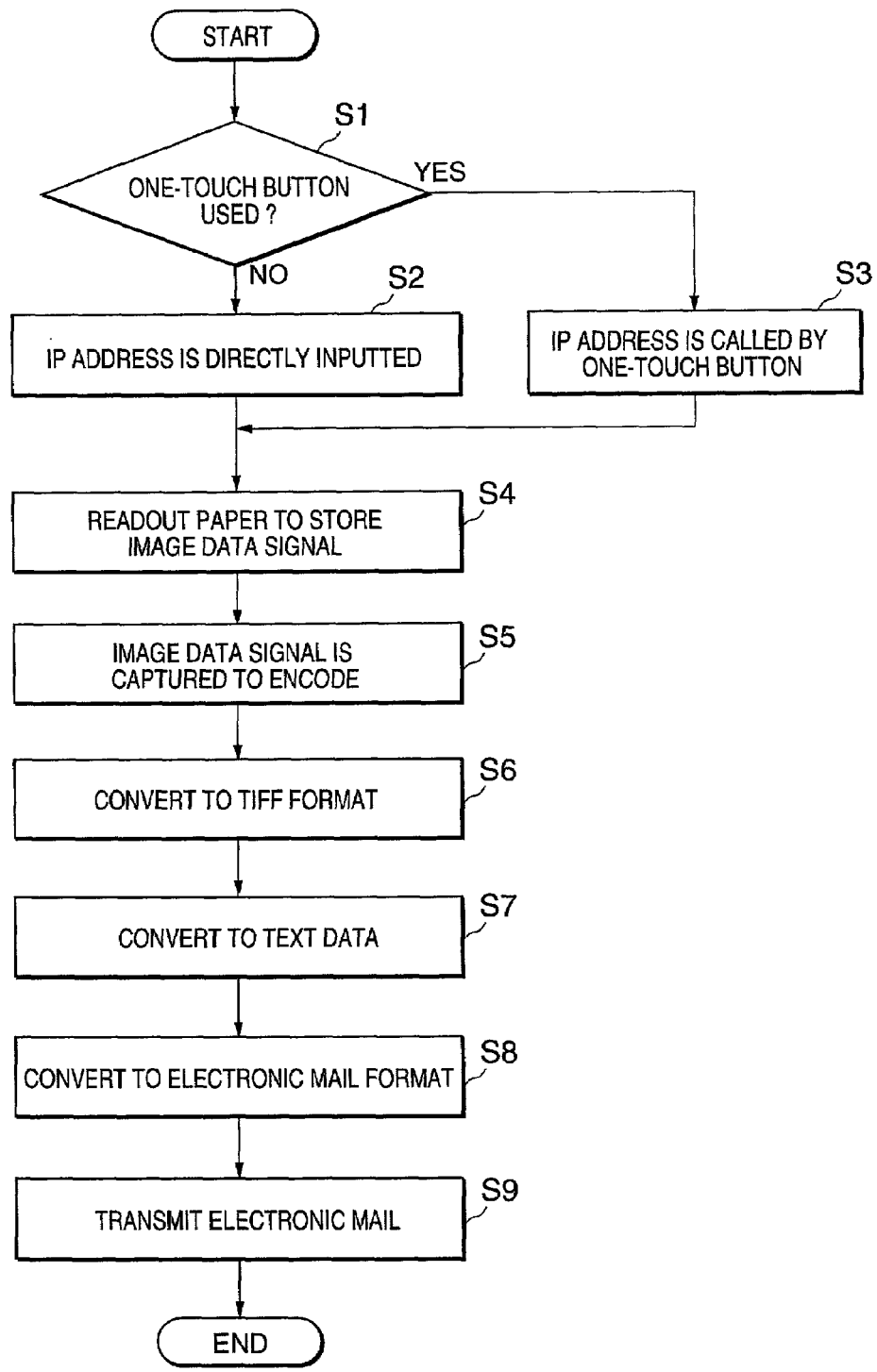
FIG. 7 is a flowchart showing an operation of a network scanner apparatus according to a first embodiment of this invention.

The user sets a paper to be scanned on a paper stand (not shown) of the network scanner apparatus 100, and directly inputs the IP address as the transmitting destination via the operation portion 1 (step S2 in FIG. 7).

Alternatively, the user can register the IP address in the one touch button memory portion 2 in advance without the direct input, and call the registered information during the scanning operation so as to shorten the input operation (steps S1 and S3).

The operation portion 1 supplies the readout transmission requirement into the readout transmitting control portion 4 when the IP address is inputted. The readout transmitting control portion 4 supplies the scan requirement into the paper readout portion 5 on the basis of the readout transmission requirement.

The paper readout portion 5 reads-out the paper set on the paper stand, converts the readout data signal into the digital data signal, stores the image data signal in the image storing portion 6, and supplies the scan completion notice into the readout transmitting control portion 4 after the completion of the storing (step S4).

When the readout control portion 4 receives the scan completion notice, the readout transmitting control portion 4 supplies the transmission requirement into the transmission portion 7 using the IP address designated by the readout transmission requirement as the transmitting destination.

The transmission portion 7 captures the image data signal stored in the image-storing portion 6 based upon the transmission requirement, and transfers the data signal. In the data conversion, the data signal is encoded by the use of the known encode system, such as, MH, MR, MMR, and JBIG (step S5). Herein, it is to be noted that the user will select the encode system in advance.

Subsequently, the encoded image data is converted into the TIFF format by attaching a TIFF header information (step S6). Next, the image data signal converted into the TIFF format is converted from binary into text (step S7).

Thereafter, the image data signal is converted into an electronic mail format by attaching an electronic mail header information (step S8).

The transmission portion 7 transmits the obtained image data signal of the electronic mail format by the electronic mail using the protocol control portion 8 (step S9). In this event, the transmission portion 7 utilizes(the SMTP protocol given by the protocol control portion 8 using the IP address designated by the transmission requirement as a parameter.

The protocol control portion 8 provides the function of the SMTP protocol by the use of the function of the TCP protocol given by the transporting portion 9.

Figure 9:
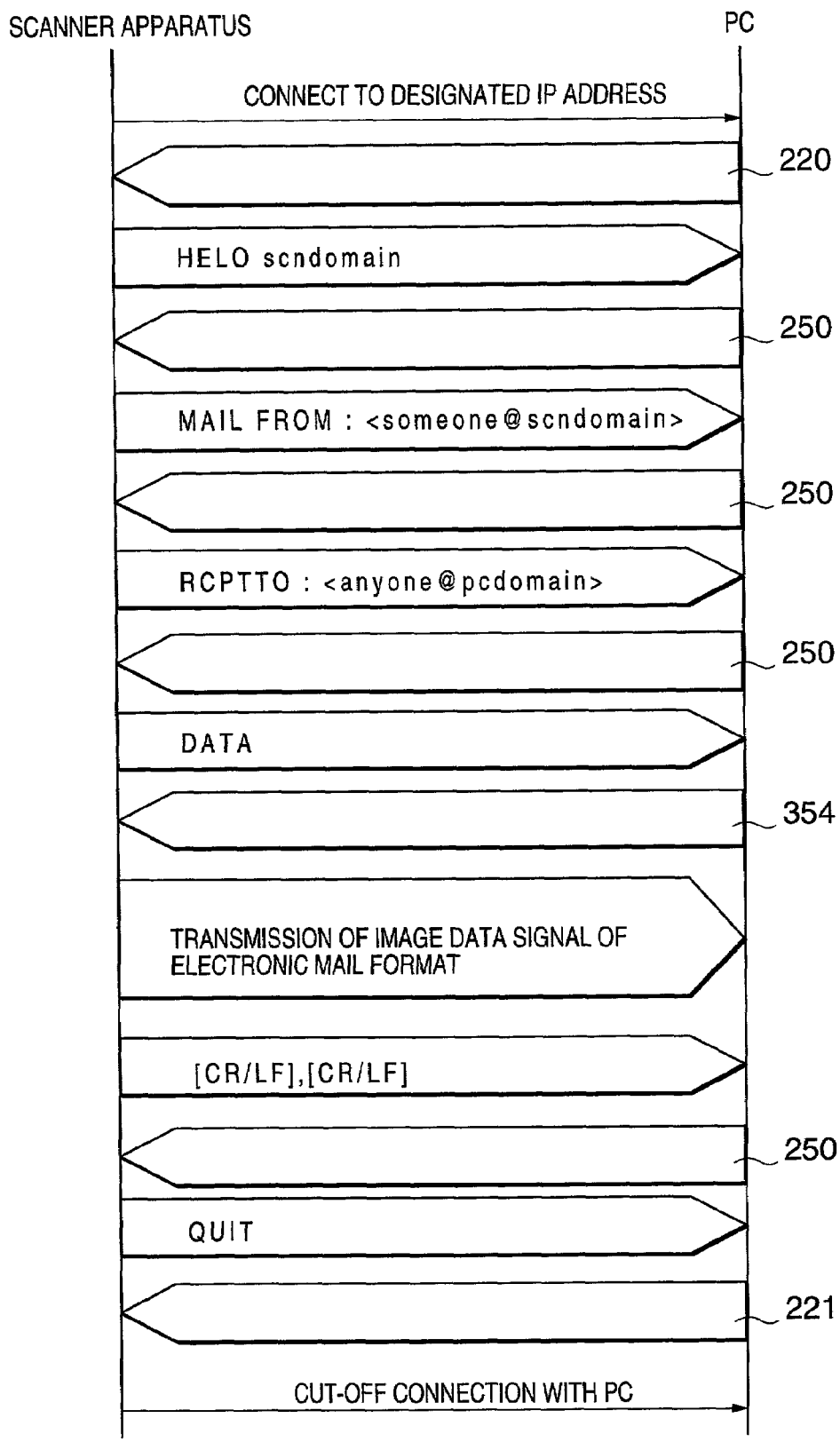
FIG. 9 is a sequence chart showing an operation of a first embodiment of this invention.

Practically, a character series is transmitted and received as indicated in the sequence illustrated in FIG. 9 between the protocol control portion 8 of the network scanner apparatus 100 and the protocol control portion 305 of the PC 300.

Hereinafter, description will be made about the general operation thereof.

First, a connection operation is carried out for the PC having the IP address designated as the above-mentioned parameter. Thereafter, the scanner apparatus 100 receives the character series defined by "220" from the PC 300. This number represents a result code that means "service is prepared".

Subsequently, the scanner apparatus 100 transmits the character series defined as "HELO scndomain". Although a portion of "scandomain" indicates a host name at a client side, a name fixed as "scndomain" is defined in this embodiment.

Thereafter the scanner apparatus 100 receives a character series defined by "250". This is a result code that means that "required operation is completed". Next, the scanner apparatus 100 transmits "MAIL FROM: <someone@scandomain>", and receives "250".

Although a portion of "someone@scandomain", represents a mail address of a sending party, a fixed name defined as "someone@scandomain" is used in this embodiment.

Subsequently, the scanner apparatus 100 transmits "RCPT TO: <anyone@pcdomain>", and receives "250". Although a portion of "anyone@pcdomain" represents a mail address of a receiving party, a fixed name defined as "anyone@pcdomain" is used in this embodiment.

Successively, the scanner apparatus 100 transmits "DATA", and receives "354". This is a result code that means "start transmitting the mail". Next, the scanner apparatus 100 transmits the Image data signal converted into the electronic mail format.

Further the scanner apparatus 100 transmits ".(period)" following to a control code [CR/LF] at the end of the image data signal, successively transmits a control code [CR/LF], and receives "250".

Finally, the scanner apparatus 100 transmits "QUIT", and receives "221". This is a result code that means service closes a transmission channel.

Immediately after this, the connection between the scanner apparatus 100 and the PC 300 is cut off, and the electronic mail transmission operation is completed.

In the above-mentioned SMTP protocol operation, the host name is defined as "scndomain", the malt address of the sending party is defined as "someone@scndomain", and the mail address of the receiving party is defined "anyone@pcdomain", as the fixed character series, respectively.

Originally the SMTP protocol is used in the case of transmitting and receiving the electronic mail with a mail server, and the information is defined as attribute information of the electronic mail.

However, the information is used so as to directly transmit and receive the image data signal between the network scanner apparatus 100 and the PC 300, and the information is cut off and removed at the receiving side in this embodiment.

Therefore, temporary fixed names are assigned for the information so as to constitute as the SMTP protocol in this embodiment.

Figure 8:
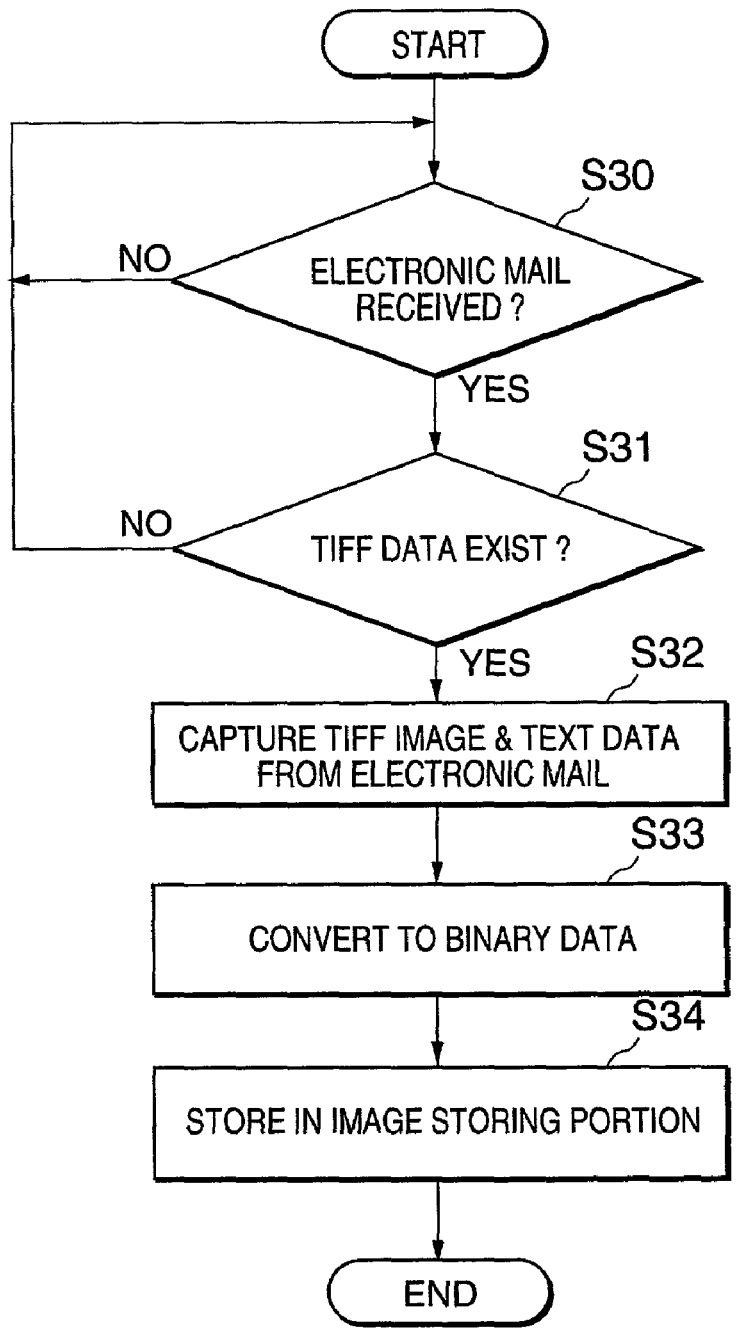
FIG. 8 is a flowchart showing an operation of a PC according to a first embodiment of this invention.

The protocol control portion 305 of the PC 300 receives the electronic mail by the SMTP protocol using the function of the TCP protocol provided by the transport control portion 306, as indicated by the above-mentioned sequence (step S30 in FIG. 8).

When the receiving portion 304 detects that the received electronic mail has the TIFF format data signal (step S31), the TIFF format of the text data signal is extracted or taken out from the electronic mail (step S32) to perform text to binary conversion (step S33), and the converted data is stored in the image storing portion (step S34).

The image-storing portion 303 may be generally a file-system of the PC structured on a hard disk. The user can deal with the image data signal received as the TIFF format file stored on the hard disk of the PC.

Subsequently, description will be made about the operations of the transport control portions 9, 306, the network control portions 10, 307, and the data link control portions 11, 308 in the network scanner apparatus 100 and the PC 300.

The data link control portions 11, 308 is provided with the function of the data link layer of the OSI reference model, and transmits the data signal by controlling the Ethernet.

The Ethernet has one cable, and a plurality of terminals can be connected thereto. When one terminal connected to thereto transmits a data signal, the signal is transmitted to all terminals connected to the cable.

The terminal connected to the Ethernet is physically identified by a hardware address called a MAC (Media Access Control) address expressed by an integral value of 48-bit length.

Herein, the MAC address is generally expressed by the use of 16 digit and 12 figure, as 0A1B2C3D4E5F. The data of the data link layer is transmitted using the MAC address as the destination.

Further, all of the transmitted data signals are received. When the MAC address of the transmitting destination is an own address or a broad cast (transmission for all in the same network), the data signal is captured, and otherwise is removed.

In this case, the own MAC address is written in an internal firmware in the base of a NIC board, and the own MAC addresses are generally assigned for all NIC boards. Similarly, the network scanner apparatus 100 and the PC 100 according to this embodiment have the own MAC addresses in the data link control portions 11, 308.

The above data transmission function provided by the data link control potions 11, 308 is a communication in the same Ethernet, and can not serves to communicate with the network outside the router.

More specifically, the communication is possible between the network scanner apparatus 100 and the PC 300 illustrated in FIGS. 3 and 4.

However, the communication can not be performed between the network scanner apparatus 100 and the PCs 500 and 600 apart therefrom, as illustrated in FIGS. 5 and 6. Such a communication can be realized by IP provided by the network control portions 10, 307.

Each of the network control portions 10 and 307 has the function of the network layer of the OSI reference model, and provides IP (Internet Protocol). The IP transmits the data signal by the use of a packet switching system.

Namely, the data signal to be transmitted is divided into a specific size, the data signal is transmitted at every sizes. Herein, it is to be noted that the divided data signal is generally called an IP packet or an IP data program.

Figure 10:
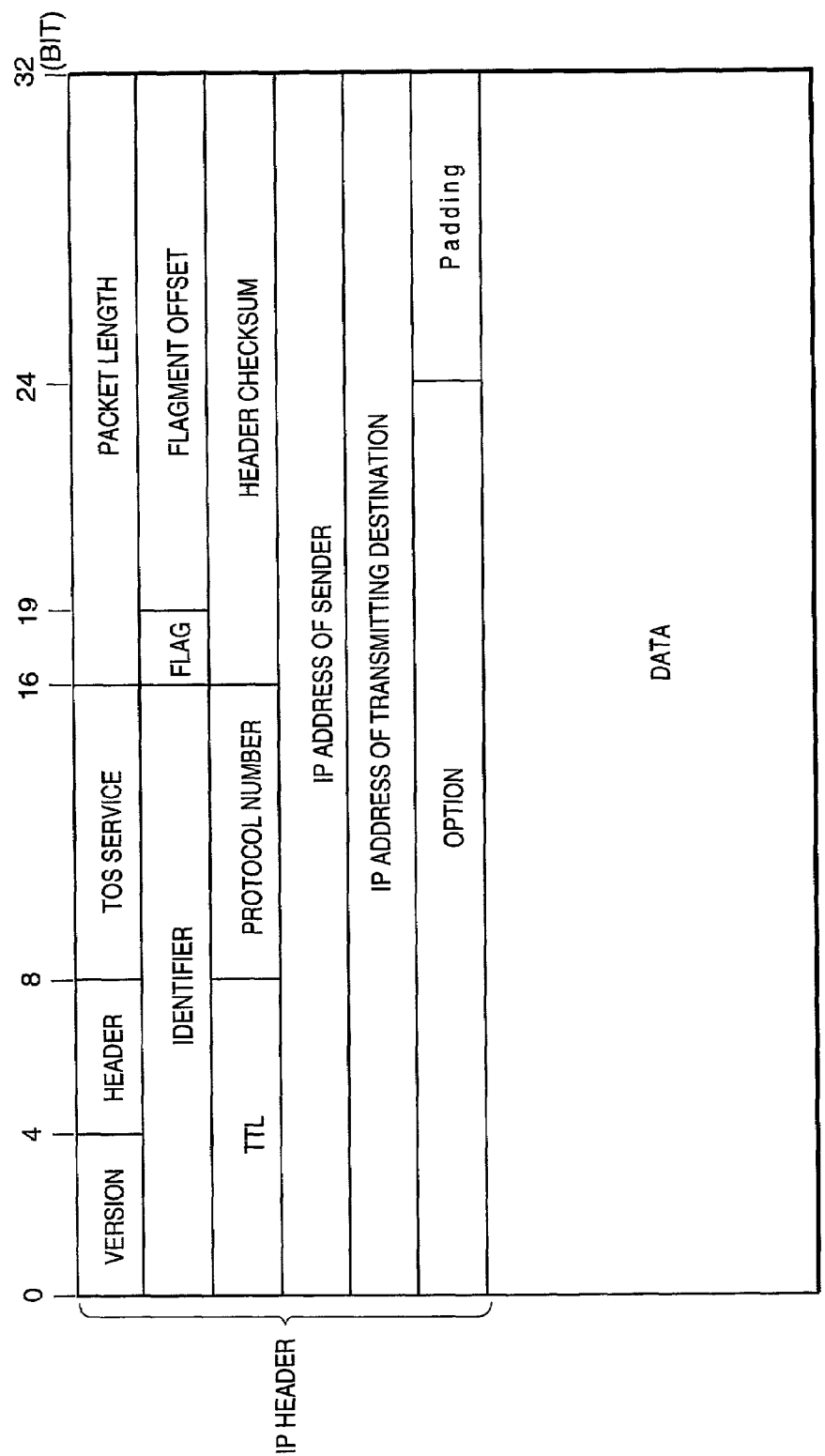
FIG. 10 is a structure diagram showing a format of an IP packet.

In the IP format illustrated In FIG. 10, a header information called an IP header is attached to each of the divided data signals, and the IP address of the sender and the IP address of the transmitting destination are stored in the IP header, respectively.

Although the IP address is used as the destination in such an IP, the IP address is converted into the MAC address using ARP (Address Resolution Protocol) to perform the transmission in the data link layer.

Figure 11A:
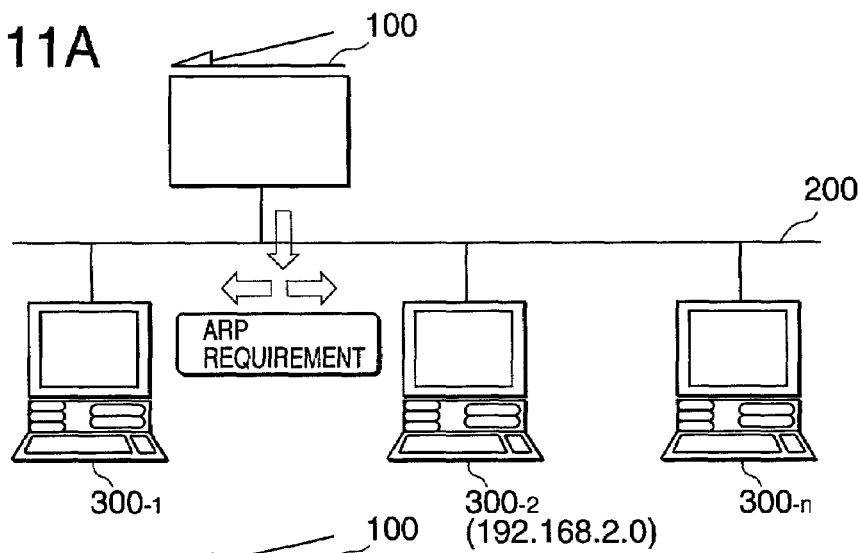
FIGS. 11A through 11C is a structure diagram showing an operation of a first embodiment of this invention.
Figure 11B:
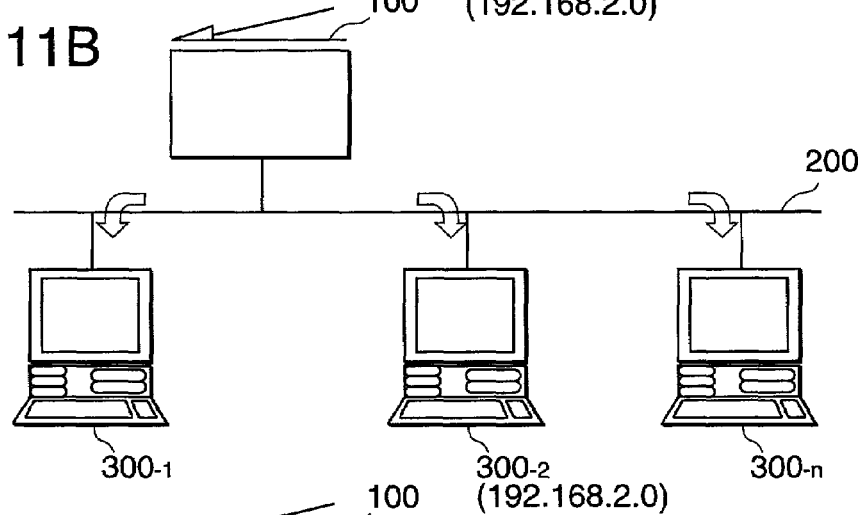
Figure 11C:
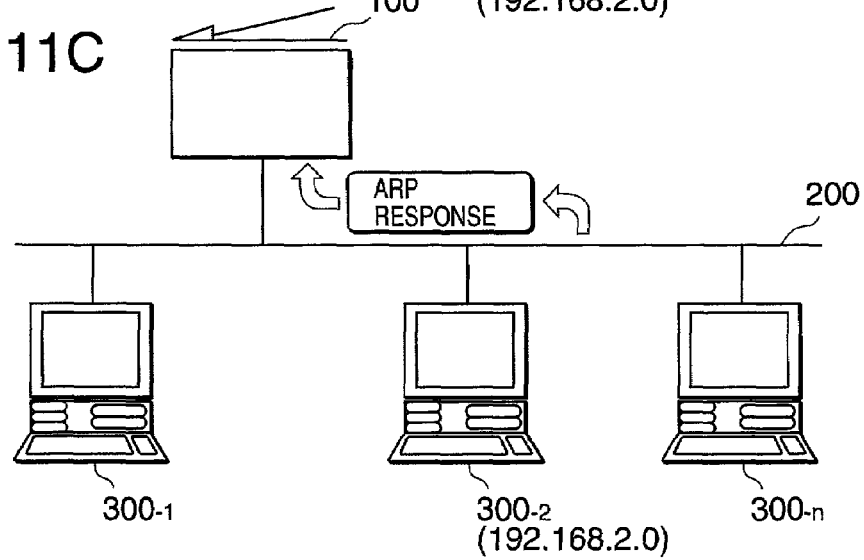

As illustrated in FIGS. 11A through 11C, the ARP broadcasts an ARP requirement packet, and receives an ARP response packet. Thereby, the MAC address of the terminal connected to the same Ethernet is obtained.

In this event, the MAC address obtained by the ARP response is cashed during constant time to enhance transmission efficiency as the IP.

This is called an ARP table. In the case where the address is processed or resolved by ARP, the MAC address to be determined is utilized with reference with the ARP table, if the address exists therein, and otherwise, the ARP requirement address is broadcasted.

When the IP packet is transmitted from the network scanner apparatus 100 and the PC 300, use is made about the local address, the sub-netmask and the default root registered in the network setting memory portions 3 and 302 in advance.

When an AND value between the IP address of the transmitting destination and the sun-netmask is equal to an AND value between the local IP address and the sub-netmask, it is judged that the transmitting destination is connected to the same Ethernet 200. In this case, the IP address of the transmitting destination is converted into the MAC address by the ARP and the IP packet is transmitted by the use of the data link control portion 11.

If not equal, it is judged that the transmitting destination is not connected to the same Ethernet 200, Thereafter, the IP address of the default root is converted into the MAC address by the ARP, and the IP packet is transmitted by the use of the data link control portion 11.

Under this circumstance, the IP packet is transmitted to the router 400 because the IP address of the router is generally set for the default root.

When the router 400 receives the IP packet, the router 400 refers the IP address of the transmitting destination stored in the header of the IP packet. In the case that the IP address is not the own IP address, a transmission process is carried out for the nearest network.

More specifically, if the terminal having the IP address of the transmitting destination exists in the Ethernet connected to the own terminal, the IP packet is transmitted to the terminal, and otherwise, is transmitted to the other suitable router 400.

Figure 12:
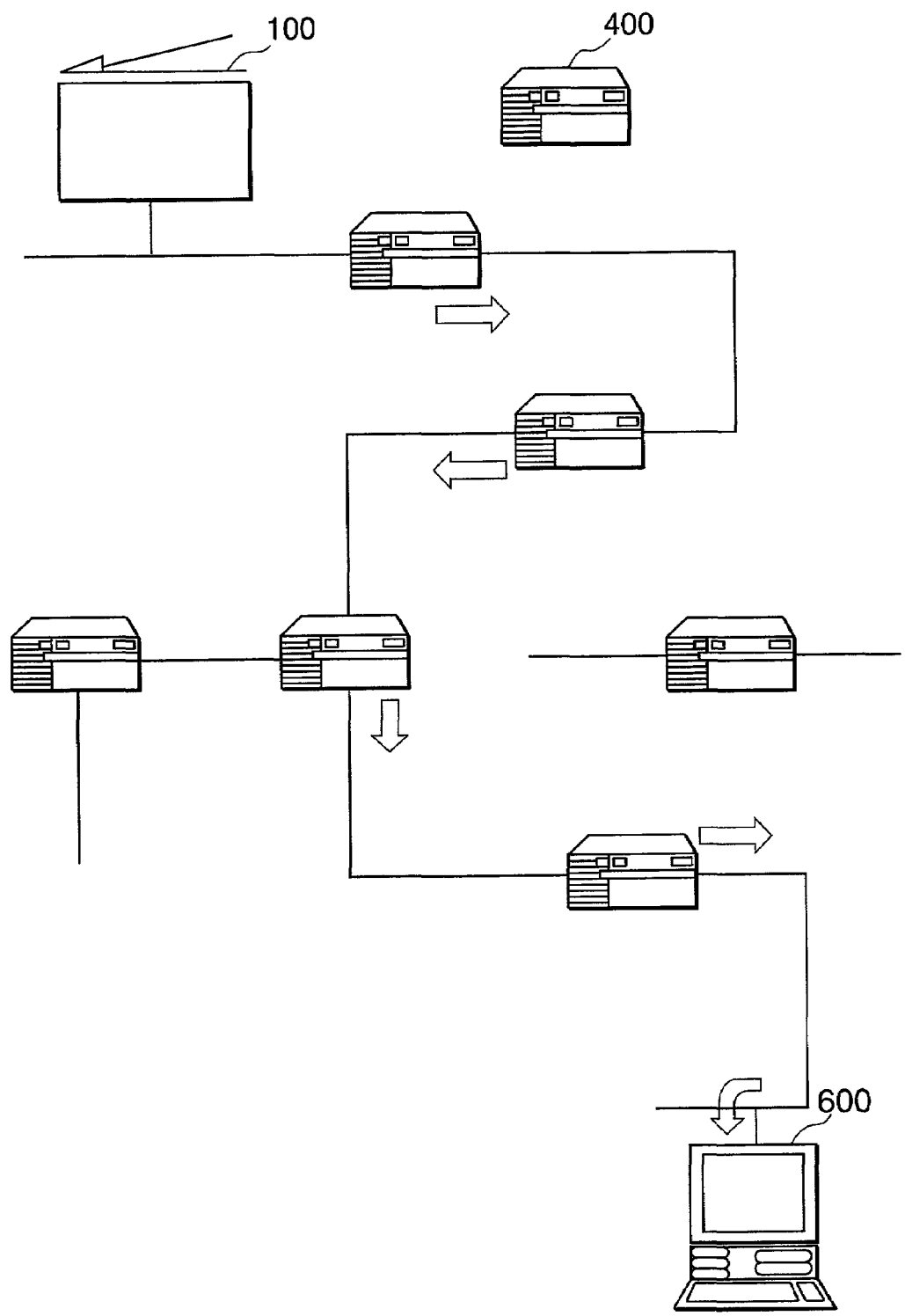
FIG. 12 is a structure diagram showing an operation of a first embodiment of this invention.

Thereby, the IP packet passes through several routers 400, as illustrated in FIG. 12. Thus, the IP packet is transmitted to the terminal having the IP address of the transmitting destination.

Accordingly, the IP address and the local IP address of the network scanner apparatus 100 set in the operation portion 1 by the user are stored a head portion of the IP packet. In this condition, several routers 400 refer the IP address of the header. Thereby, the transmission is repeated so as to transmit to the PC.

The PC extracts the IP address of the transmitting destination from the header, and the IP packet is transmitted to the network scanner apparatus 100 by the IP address and the local Ip address in the same manner. Thus, the direct communication is realized between the network scanner apparatus 100 and the PC 300.

Each of the transport control portions 9 and 306 has the function of the transport layer of the OSI reference model, and provides TCP (Transmission control Protocol). Although UDP (User Datagram Protocol) is used other than TCP as the protocol of the transport layer in TCP/IP, it is not used in this embodiment.

The TCF transfers the data signal using the IP. Further, the TCP realizes a stream type protocol for realizing one to one communication at total-double with reliability by performing the following processes.

(1) A data guarantee due to checksum.
(2) A control of connection (connect/cut).
(3) A sequence control of packet.
(4) A response confirmation (transmission by confirming whether or not the data signal is receives at hosts of both ends).
(5) A window flow control (transmission in accordance with a buffer size of the receiving side).
(6) A congestion control (change transmission quantity in dependence upon packet losing degree).

As described above, the transport control portions 9 and 306 of the network scanner apparatus 100 and the PC 300 and the network control portion, 10 and 307 and the data link control portions 11 and 308 carries out the TCP/IP protocol.

Consequently, the network scanner apparatus 100 and the PC 300 can perform the direct communication without using the server device such as, the mail server.

A first advantage of this embodiment will be explained as follows.

When the image data signal readout by the network scanner apparatus 100 transmitted to the PC 300, it is unnecessary to use the server device, such as, the mail server.

This is because the direct communication becomes possible between the network scanner apparatus 100 and the PC 300 by using the IP address as the transmitting destination by the use of the TCP/IP protocol, Thereby, when the network apparatus 100 is introduced, it is unnecessary to prepare the server device, such as, the mail server. In consequence, introduction cost and operation cost becomes cheaper.

The second advantage of this embodiment will be explained as follows.

Any load is not applied to the mail server. This reason will be explained as follows. In the case where the image data signal is transmitted via the mail server, the data size of the image data signal itself is large in comparison with the normal electronic mail in many cases. Consequently, a high load is applied to the mail server so as to cause interruption such as server-down.

By contrast, such a problem does not occur in this embodiment because the mail server is not used. Thereby, this embodiment can provide the network scanner apparatus 100 having higher affinity with the present network.

The third advantages will be explained as follows.

The IP address is inputted by using the one touch button. In consequence, the input operation can be simply performed for short time.

Subsequently, description will be made about a second embodiment.

The network scanner apparatus 100 and the PC 300 have the same structures as the first embodiment illustrated in FIGS. 1 and 2.

Although the SMTP protocol is used between the network scanner apparatus 100 and the PC 300 in the first embodiment, an FTP (File Transfer Protocol) protocol is used in the second embodiment. The transmission portion 7, the receiving portion 304 and the protocol control portions 8 and 305 are different from the first embodiment in operations.

The transmission portion 7 captures the image data signal stored in the image storing portion 6 on the basis of the transmission requirement from the readout transmitting control portion 4, and converts the data signal. Such a data conversion must be carried out in accordance with protocol used by the protocol control portion 8.

However, if the file transfer is performed with the FTP binary type, the data signal can be directly transmitted to the PC 300. Therefore, the image date signal is converted to the TIFF format considering the use by the PC 300 into account.

The data signal is first encoded by the use of the encoded system, such as, MH, MMR, and JBIG. Herein, it is to be noted that the user selects the encoded system in advance.

Successively, the TIFF header information is attached to the encoded image data signal to convert into the TIFF format. The transmission portion 7 transmits the data signal having the TIFF format with the file using the protocol control portion 8.

In this case, the FTP protocol provided by the protocol control portion 8 is utilized using the IP address designated by the above transmission requirement as a parameter.

The protocol control portion 8 provides the function of the FTP protocol using the function of the TCP protocol provided by the transport control portion 9.

Figure 13:
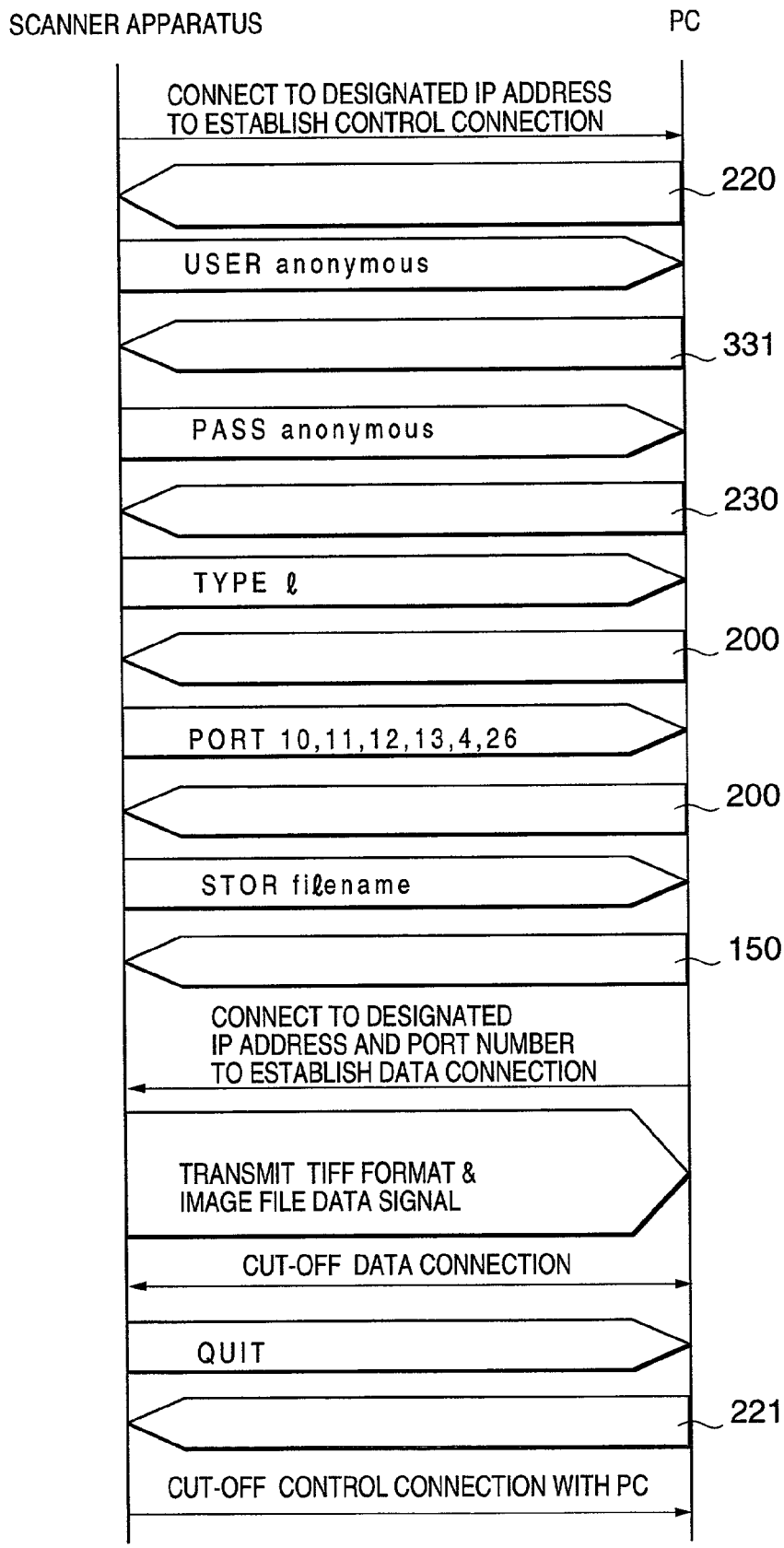
FIG. 13 is a sequence chart showing an operation of a second embodiment of this invention.

Practically, the character series is transmitted and received as indicated by the sequence illustrated in FIG. 13 between the protocol control portion 8 of the network scanner apparatus 100 and the protocol control portion 305 of the PC 300 by the use of the TCP protocol.

Hereinafter, the general operation will be explained.

The FTP performs two connections of "control connection" and "data connection" to realize the file transfer function. First, the connection operation is carried out for the PC having the IP address designated as the above parameter.

Thereafter, the scanner apparatus receives the character series defined by "220" from the PC. The number represents the result code that means "a new user is acceptable".

Next, the scanner apparatus transmits a character series of "USER anonymous". Herein, a portion of "anonymous" represents a user name.

Thereafter, the scanner apparatus receives a character series defined by "331". This is a result code that means "a user name is OK, and a password is necessary".

Subsequently, the scanner apparatus transmits "PASS anonymous". A portion of "anonymous" represents a password for login of the use name. Thereafter, the scanner apparatus receives "230" from the DC, "230" is a result code that means the user completed the login, and can proceed ahead.

Successively, the scanner apparatus transmits "TYPE I", and receives "200". Herein, "TYPE I" represents that the type of the file, which will be transmitted "represents an image data signal", and "200" is a result code that means "command OK".

Next, the scanner apparatus transmits "PORT 11, 12, 13, 14, 4, 26", and receive, "220". Herein, "PORT" represents the IP address and a port number. 11, 12, 13, 14 represent the local address of the network scanner apparatus while 4, 26 is 10 digit per 1 bite of the port number.

Subsequently, "STOR file name" means that the file transfer is carried our from he network scanner apparatus to the PC immediately after while "filename" indicates the file name to be stored.

Next, the PC performs the, connection by the IP address designated by PORT and the port number to establish the data connection. Immediately after this, the image data signal having the TIFF format is transmitted from the network scanner apparatus to the PC. When the transmission is completed, the data connection is cut off.

Finally, the scanner apparatus transmits "QUIT", and receives "221". Herein, "221" is a result code that means "a control connection is closed". Immediately after this, the control connection with the PC is cut off, and the file transmission operation is completed.

The protocol control portion 305 of the PC 300 receives the image data signal having the TIFF format due to the FTP protocol as indicated the above sequence using the function of the TCP protocol provided by the transport control portion 306.

The receiving portion 304 stores the received image data signal having the TIFF format in the image staring portion 303. The image-storing portion 303 is generally a file system structured on a hard disk. The user can deal with image data signal received as the TIFF format file stored on the hard disk of the PC.

Subsequently, description will be made about a recording medium which records a program according to a third embodiment.

When the network scanner apparatus 100 according to the above-mentioned first and second embodiments is structured by a computer system having a CPU and a memory such as a ROM, this memory constitutes the recording medium which records the program according to this invention.

The program for executing the process including the flowchart illustrated in FIG. 7 is stored in the recording medium based upon the operations explained in the respective embodiments.

In this event, the recording medium may include a semiconductor memory device, an optical disk, and a magnetic-optical disk, and a magnetic recording medium, and these may be structured as a ROM, a COD-ROM, a FD, a magnetic card, a magnetic tape, and a memory card.

Accordingly, the recording medium may be used in the other network scanner apparatus other than the network scanner apparatus according to the respective embodiments, and the computer can execute the process in accordance with the program stored in the recording medium.

Thereby, the function and effect equivalent to the respective embodiments can be obtained so as to achieve the above-mentioned object of this invention.

While this invention has thus far been disclosed in conjunction with several embodiments thereof, it will be readily possible for those skilled in the art to put this invention into practice in various other manners.

What is claimed is:

1. A network scanner comprising:
control means which controls a network by TCP/IP protocol;
readout means which reads out a paper to produce an image data signal;
input means which inputs an IP address as a transmitting destination of the image data signal;
converting means which converts the IP address of the transmitting destination inputted by the input means into a MAC address by using address resolution protocol (ARP);
communication means which transmits the image data signal obtained by the readout means to a terminal having the inputted IP address of the transmitting destination on the network by packet switching;
network storage means which registers an IP address of the network scanner itself that transmits the image data signal, a subnet mask and a default root;
judging means which judges whether or not an AND value between the IP address of the transmitting destination and the subnet mask is equal to an AND value between the IP address of the network scanner itself registered in the network storage means and the subnet mask;
default converting means which converts the IP address of the default root into the MAC address by using the address resolution protocol (ARP); and
router communication means which transmits the image data signal into a router having the IP address of the default root by the packet switching; wherein
when the AND values are equal to each other, the IP address of the transmitting destination is converted into the MAC address by the converting means and the image data signal is transmitted into the terminal having the IP address of the transmitting destination by the communication means, and
when the AND values are not equal to each other, the IP address of the default root is converted into the MAC address by the default converting means and the image data signal is transmitted into the router having the IP address of the default root by the router communication means.

2. The network scanner as claimed in claim 1, further comprising:
storing means which caches the MAC address converted by the converting means for a constant time;
wherein the IP address inputted by the input means is converted into the MAC address by the use of the MAC address cached in the storing means.

3. A computer-readable storage medium, storing a program executed by a network scanner which registers an IP address of a computer itself that transmits an image data signal, a subnet mask and a default root, comprising the steps of:
controlling a network by TCP/IP protocol;
reading out a paper to produce an image data signal;
inputting an IP address as a transmitting destination of the image data signal;
converting the inputted IP address of the transmitting destination into a MAC address by using address resolution protocol (ARP);

transmitting the image data signal into a terminal having the inputted IP address of the transmitting destination on the network by packet switching;

judging whether or not an AND value between the IP address of the transmitting destination and the subnet mask is equal to an AND value between the IP address of the computer itself and the subnet mask;

converting the IP address of the default root into the MAC address by using the address resolution protocol (ARP); and transmitting the image data signal into a router terminal having the IP address of the default root by the packet switching; wherein when the AND values are equal to each other, the IP address of the transmitting destination is converted into the MAC address and the image data signal is transmitted into the terminal having the IP address of the transmitting destination, and when the AND values are not equal to each other, the IP address of the default root is converted into the MAC address and the image data signal is transmitted into the router having the IP address of the default root.

* * * * *